United States Patent
Goto et al.

(10) Patent No.: US 8,261,209 B2
(45) Date of Patent: Sep. 4, 2012

(54) UPDATING CONTENT DISPLAY BASED ON CURSOR POSITION

(75) Inventors: Ken Goto, San Francisco, CA (US); Brian Dote, Waipahu, HI (US); Teresa Yuchin Tsui, Sunnyvale, CA (US); Chris Rudolph, Camas, WA (US)

(73) Assignee: Apple Inc., Cupertino, CA (US)

( * ) Notice: Subject to any disclaimer, the term of this patent is extended or adjusted under 35 U.S.C. 154(b) by 868 days.

(21) Appl. No.: 11/834,589

(22) Filed: Aug. 6, 2007

(65) Prior Publication Data

US 2009/0044133 A1 Feb. 12, 2009

(51) Int. Cl.
*G06F 3/048* (2006.01)
*G06F 3/00* (2006.01)

(52) U.S. Cl. .................. 715/838; 715/744; 715/823

(58) Field of Classification Search .............. 715/711, 715/821–823, 835, 838, 856–862, 781
See application file for complete search history.

(56) References Cited

U.S. PATENT DOCUMENTS

| | | | | |
|---|---|---|---|---|
| 5,699,458 | A * | 12/1997 | Sprague | 382/250 |
| 6,904,450 | B1 * | 6/2005 | King et al. | 709/203 |
| 7,100,123 | B1 * | 8/2006 | Todd et al. | 715/862 |
| 7,197,751 | B2 * | 3/2007 | Fedotov et al. | 719/323 |
| 7,689,915 | B2 * | 3/2010 | Kitamaru et al. | 715/711 |
| 7,836,091 | B2 * | 11/2010 | Deshpande | 707/798 |
| 2002/0078467 | A1 * | 6/2002 | Rosin et al. | 725/110 |
| 2002/0163545 | A1 | 11/2002 | Hii | |
| 2003/0146939 | A1 | 8/2003 | Petropoulos et al. | |
| 2005/0223329 | A1 * | 10/2005 | Schwartz et al. | 715/711 |
| 2005/0231512 | A1 * | 10/2005 | Niles et al. | 345/473 |
| 2005/0283734 | A1 | 12/2005 | Santoro et al. | |
| 2006/0023523 | A1 | 2/2006 | Perner | |
| 2006/0026523 | A1 | 2/2006 | Kitamaru et al. | |
| 2008/0155458 | A1 * | 6/2008 | Fagans et al. | 715/781 |
| 2009/0044133 | A1 * | 2/2009 | Goto et al. | 715/754 |

OTHER PUBLICATIONS

Examination Report for corresponding European Patent Application No. 08772411.8, mailed Jun. 7, 2010, 5 pages.
Australian Examiner's First Report dated Oct. 14, 2010 for Patent Application No. 2008284179, 2 pages.
Chinese Patent Office First Office Action (with English translation) for Application No. 200880109358.0 dated Dec. 23, 2011, 19 pages.

* cited by examiner

*Primary Examiner* — Robert Stevens
*Assistant Examiner* — Andrew Tank
(74) *Attorney, Agent, or Firm* — Fish & Richardson P.C.

(57) ABSTRACT

A computer-implemented method can include displaying a display region, on a display device associated with a computer system, corresponding to a container at a remote location operatively coupled to the computer system over a network, wherein the container includes at least two content items, dividing the display region into at least two portions, wherein each portion corresponds to one of the at least two items, and upon detecting a positioning of a cursor in a first portion of the at least two portions, transmitting a request to the remote location for a first content item, of the at least two content items, receiving the first content item, and displaying the first content item in the display region.

34 Claims, 8 Drawing Sheets

UPDATING CONTENT DISPLAY BASED ON CURSOR POSITION

TECHNICAL FIELD

This disclosure relates to viewing items of content, e.g., digital images, on a display device.

BACKGROUND

Photographs taken using devices such as digital cameras, cellular telephones, and the like, can be transferred either individually as files or collectively as folders containing multiple files from the devices to storage devices. The storage devices can be operatively coupled to the devices, e.g., a hard disk of a computer, or can be remote locations to which the devices can be operatively coupled over a network such as the internet.

Software applications, such as iPhoto (manufactured by Apple, Inc. of Cupertino, Calif.), can be used to arrange, display, and edit digital photographs obtained from a camera or any other electronic image in a digital format. Such software applications provide a user in possession of a large repository of photographs with the capabilities to organize, view, and edit the photographs. Users can organize photographs into albums and create slide shows to view the albums. Software manufacturers regularly add features to the software so that frequent operations, including transferring photographs from the device to a computer, and arranging and displaying the photographs, are relatively easy for an average user to perform.

SUMMARY

In one example, a display region can be displayed on a display device. The display region can represent a container including multiple items of content, e.g., digital images, where the items of content are stored in a remote location operatively coupled to the display device over a network, such as the internet. The display region can be divided into portions where a portion can correspond to one or more items of content in the container such that, when a user positions a cursor over the portion, one of the items in the container, corresponding to the portion, can be displayed in the display region. When the user moves the cursor to a new portion within the display region, the region can be updated to display one of the items in the container corresponding to the new portion. In this manner, one or more items of content in the container can be displayed in the display region representing the container by moving the cursor over the region. Such an effect of moving the cursor over the region to display images in the region can be one of several animation effects that can be applied to a display region.

In one aspect, a computer-implemented method is described. The method includes displaying a display region, on a display device associated with a computer system, corresponding to a container at a remote location operatively coupled to the computer system over a network, wherein the container includes at least two content items, dividing the display region into at least two portions, wherein each portion corresponds to one of the at least two items, and upon detecting a positioning of a cursor in a first portion of the at least two portions, transmitting a request to the remote location for a first content item, of the at least two content items, receiving the first content item, and displaying the first content item in the display region.

This, and other aspects, can include one or more of the following features. The content items can be digital images. The at least two content items can be stored in the container in a sequence, the sequence representing an order in which the content items were captured. A progression of positions in the display region from left to right can correspond to an order of content items in the sequence from a start of the sequence to a finish of the sequence. The method can include receiving at least two identifiers from the remote location, wherein each identifier corresponds to a content item of the at least two content items. The method can include, upon detecting the positioning of the cursor in the first portion, identifying the first content item corresponding to the first portion, transmitting a request to the remote location for the content item corresponding to the identifier corresponding to the first item, receiving a content item corresponding to the identifier from the remote location, and displaying the received content item on the display device. The method can further include, upon detecting the positioning of the cursor from the location in the first portion to a location in a second portion of the at least two portions, transmitting a request to the remote location for a second content item, receiving the second content item from the remote location, and displaying the received second content item on the display device. The method can further include, upon detecting the positioning the cursor outside the display region, displaying a default item of the at least two items in the region. The default item can be determined based on user input. The method can further include, when a number of items of content in a container exceeds a threshold, forming at least two groups of items of content, a group including at least two but less than all the items of content in the container, dividing the display region into group portions, wherein each group portion corresponds to one of the groups, assigning one item of content in a group as a representative item for the group, and, upon detecting a positioning of a cursor in a first group portion, transmitting a request to the remote location for the representative item of the first group, corresponding to the first group, receiving the representative item, and displaying the representative item in the region.

In another aspect, a medium bearing instructions to enable one or more machines to perform operations is described. The operations include displaying a display region, on a display device associated with a computer system, corresponding to a container at a remote location operatively coupled to the computer system over a network, wherein the container includes at least two content items, dividing the display region into at least two portions, wherein each portion corresponds to one of the at least two items, and upon detecting a positioning of a cursor in a first portion of the at least two portions, transmitting a request to the remote location for a first content item, of the at least two content items, receiving the first content item, and displaying the first content item in the display region.

This, and other aspects, can include one or more of the following features. The content items can be digital images. The at least two content items can be stored in the container in a sequence, the sequence representing an order in which the content items were captured. A progression of positions in the display region from left to right can correspond to an order of content items in the sequence from a start of the sequence to a finish of the sequence. The operations can include receiving at least two identifiers from the remote location, wherein each identifier corresponds to a content item of the at least two content items. The operations can include, upon detecting the positioning of the cursor in the first portion, identifying the first content item corresponding to the first portion, transmitting a request to the remote location for the content item corresponding to the identifier corresponding to the first item, receiving a content item corresponding to the identifier from the remote location, and displaying the received content item on the display device. The operations can further include, upon detecting the positioning of the cursor from the location in the first portion to a location in a second portion of the at least two portions, transmitting a request to the remote location for a second content item, receiving the second content item from the remote location, and displaying the received second content item on the display device. The operations can further include, upon detecting the positioning the cursor outside the display region, displaying a default item of the at least two items in the region. The default item can be determined based on user input. The operations can further include, when a number of items of content in a container exceeds a threshold, forming at least two groups of items of content, a group including at least two but less than all the items of content in the container, dividing the display region into group portions, wherein each group portion corresponds to one of the groups, assigning one item of content in a group as a representative item for the group, and, upon detecting a positioning of a cursor in a first group portion, transmitting a request to the remote location for the representative item of the first group, corresponding to the first group, receiving the representative item, and displaying the representative item in the region.

In another aspect, a computer implemented method is described. The method includes displaying a user interface on a display device, displaying a display region representing a container including at least two content items in the user interface, enabling a user to add content items to the container, in response to detecting that a cursor is positioned over a first portion of the display region, applying an animation to cause a first content item of the at least two content items to be displayed in the display region, and in response to detecting that the cursor is positioned over a second portion of the display region, applying an animation to cause a second content item of the at least two content items to be displayed in the display region.

This, and other aspects, can include one or more of the following features. The method can include, upon detecting a selecting of the display region, displaying an object including a menu of animations, enabling a user to select a new animation from the menu of animations, and applying the new animation to the display region. The selecting of the display region can include positioning the cursor over the display region and selecting a pointing device configured to control the cursor. The selecting can include clicking the pointing device. The menu of animations can include one or more of dissolve, random, reveal, and fade through black. Selecting an option from the menu of animations causes no animation to be applied to the display region. The new animation can be displayed as a clickable button in the menu of animations.

In another aspect, a medium bearing instructions to enable one or more machines to perform operations is described. The operations include displaying a user interface on a display device, displaying a display region representing a container including at least two content items in the user interface, enabling a user to add content items to the container, in response to detecting that a cursor is positioned over a first portion of the display region, applying an animation to cause a first content item of the at least two content items to be displayed in the display region, and in response to detecting that the cursor is positioned over a second portion of the display region, applying an animation to cause a second content item of the at least two content items to be displayed in the display region.

This, and other aspects, can include one or more of the following features. The operations can include, upon detecting a selecting of the display region, displaying an object including a menu of animations, enabling a user to select a new animation from the menu of animations, and applying the new animation to the display region. The selecting of the display region can include positioning the cursor over the display region and selecting a pointing device configured to control the cursor. The selecting can include clicking the pointing device. The menu of animations can include one or more of dissolve, random, reveal, and fade through black. Selecting an option from the menu of animations causes no animation to be applied to the display region. The new animation can be displayed as a clickable button in the menu of animations.

The systems and techniques described here can present one or more of the following advantages. The ability to view the contents of a container by moving a cursor across a display region representing the container on a display device can enhance user experience. Transmitting an identifier pointing to an item to the receiving device on which the display region representing the container including the item is displayed can simplify identifying the item and transmitting the identified item to the receiving device. Enabling a user to apply animations to a display region representing a container containing content can enhance user experience. By enabling the user to see a summary view of the content within the container, the user can decide whether or not to access the contents of the album. This saves bandwidth, time, and decreases server load. In addition, by only returning a small subset of the content to the user, server load can further be decreased, particularly in instances where the user does not access the album to view the entire contents.

The details of one or more implementations are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
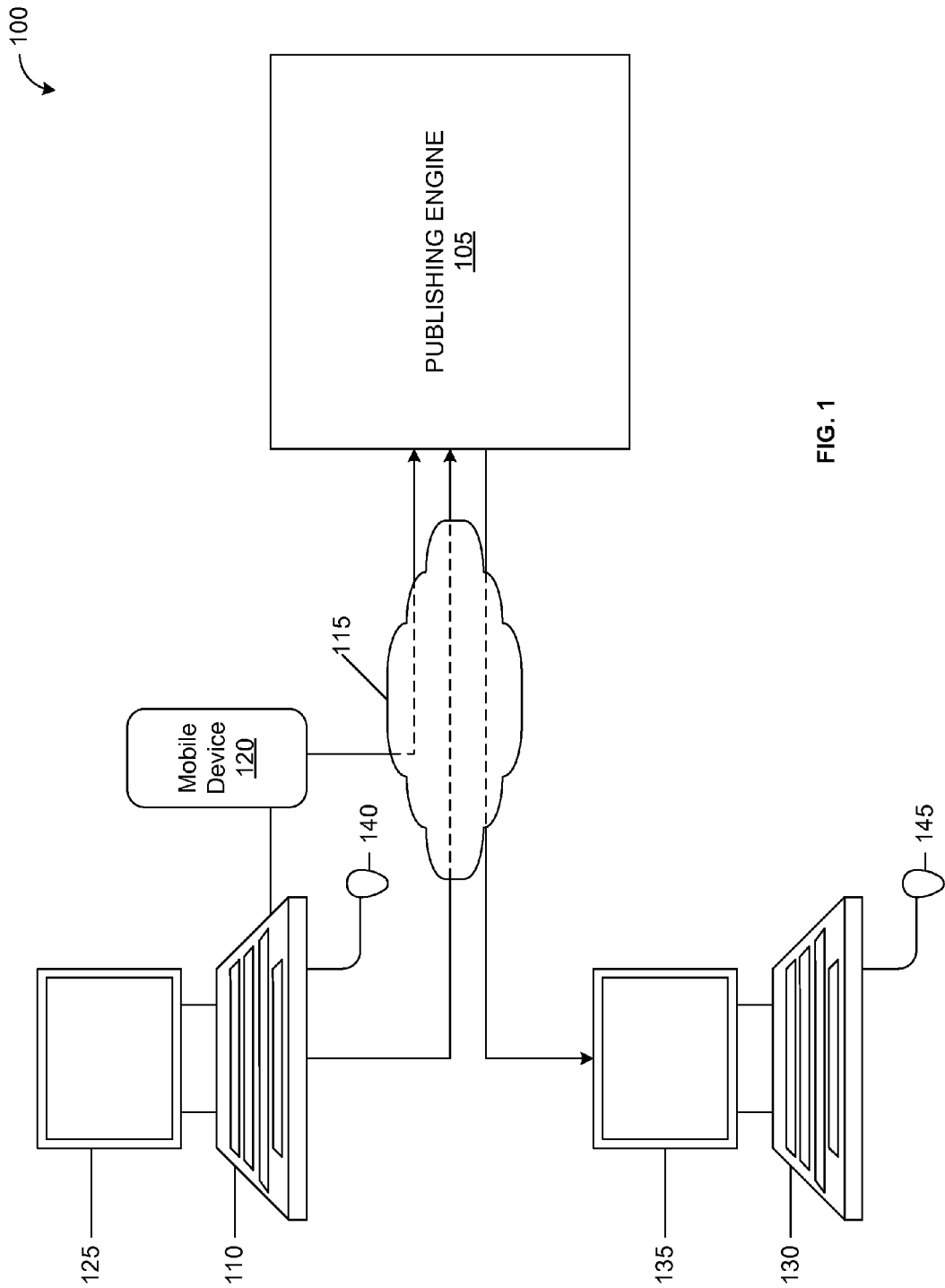
FIG. 1 is a schematic of an example of a system for transmitting and viewing content over a network.

FIG. 1 depicts a schematic of an example of a system 100 to enable a user to transmit items of content for storage at a remote location and to request the content from the remote location for viewing. The system 100 can include a publishing engine (PE) 105 configured to receive the items of content from one or more devices, including a transmitting device 110, and to store the received items. The transmitting device 110 can be virtually any computer system, e.g., desktop computer, laptop computer, personal digital assistant (PDA), and the like, operatively coupled to the PE 105 over a network 115 such as the internet. A user can capture items of content, e.g., digital images, digital video, audio, documents, and the like, and transfer the captured items to the transmitting device 110. In some implementations, the system 100 can include a mobile device 120, e.g., a cellular telephone, a digital camera, a digital camcorder, and the like, using which a user can capture the items. The mobile device 120 can be operatively coupled to the transmitting device 110 to which the captured items can be transferred. Alternatively, or in addition, the mobile device 120 can be operatively coupled to the PE 105 over the network 115 to transfer the captured items to the PE 105. The user can view the items being transmitted to the PE 105 on a display device 125 operatively coupled to the transmitting device 110.

In some implementations, the system 100 can include a receiving device 130 using which a user can request the PE 105 for the stored items of content. The receiving device can be virtually any computer system, e.g., desktop computer, laptop computer, PDA, and the like, that is operatively coupled to the PE 105 over the network 115, such as the internet. A receiving device 130 can be operatively coupled to a display device 135 on which content received from the PE 105, over the network 115, can be displayed. For example, the content received from the PE 105 over the network 115 can be displayed in a user interface on the display device 135. Pointing devices 140 and 145 can be operatively coupled to the transmitting device 110 and the receiving device 130, respectively, to operate a cursor on each device. The transmitting device 110 and the receiving device 130 can be operatively coupled to the PE 105 through wired or wireless interfaces.

In some implementations, the items of content can represent digital images transmitted to the PE 105 from a transmitting device 110, such as a computer system. The images can be stored on the PE 105 in one or more containers such as albums, e.g., in a sequence, such as the sequence in which the images were captured. When a request to view the images is received over the network 115, e.g., the internet, from a receiving device 130, e.g., a computer system, the one or more containers can be displayed as display regions in the display device 135 operatively coupled to the receiving device 130. For example, the PE 105 can generate identifiers, e.g., uniform resource locators (URLs), corresponding to each item of content in a container, each container, and a group of containers, and provide the generated identifiers to the receiving device 130. When a user accesses the identifier for the group of containers, the group of containers can be retrieved from the PE 105 and displayed on the display device 135 as a group of display regions arranged in rows. The user can use the pointing device 145 to navigate the group of containers to access each image. For example, the user can select a display region representing a container using the pointing device 145, which can cause the identifier associated with the selected display region to be selected, and a request to be transmitted to the PE 105 for the items of content in the container corresponding to the selected display region. In response, the PE 105 can transmit the items of content in the selected container, which, in turn, can be displayed on the display device 135 as rows of display regions.

When a user positions a cursor, operated by a pointing device 145 operatively coupled to the receiving device 130, over a portion of a display region representing a container including multiple digital images, a digital image in the container represented by the display region can be displayed in the region on the display device. For example, the display region can be rectangular in shape, and the image can be displayed within the area occupied by the rectangle. Subsequently, when the position of the cursor is changed to a new portion over the display region, a new image in the container can be displayed in the region. In this manner, as the cursor is moved over the display region the image displayed in the display region can be updated. The progression of portions of the display region from left to right can correspond to an order of images in the sequence from a start of the sequence to an end of the sequence. For example, when the cursor is positioned over a portion near the left edge of the display region, an image in the corresponding container, stored near the start of the sequence can be displayed in the region. When the cursor is moved to a new portion near the right edge of the display region, an image in the corresponding container, stored near the end of the sequence can be displayed in the region.

Figure 2:
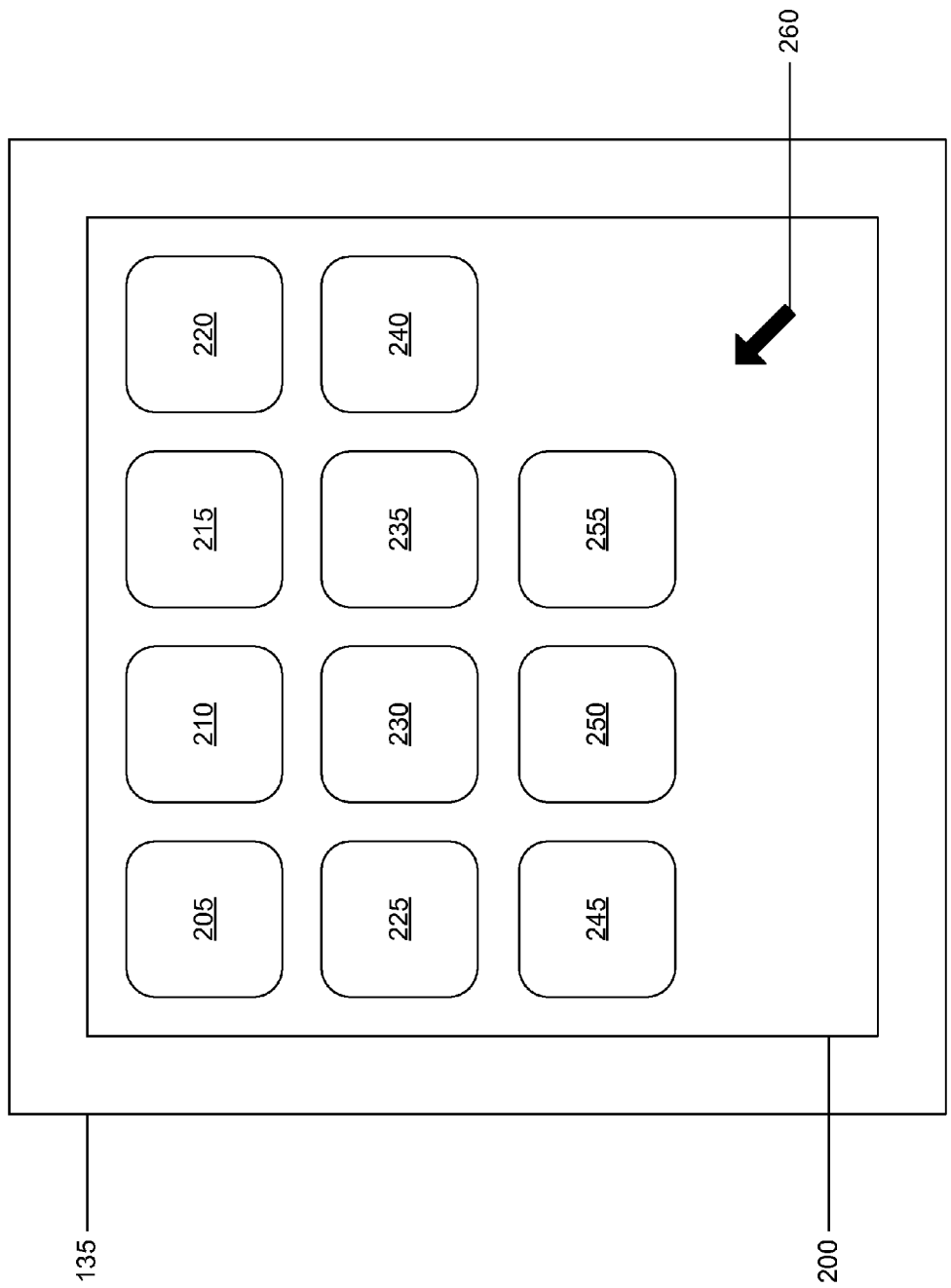
FIG. 2 is a schematic of an example of a user interface for displaying display regions representing containers including items of content.
Figure 3A:
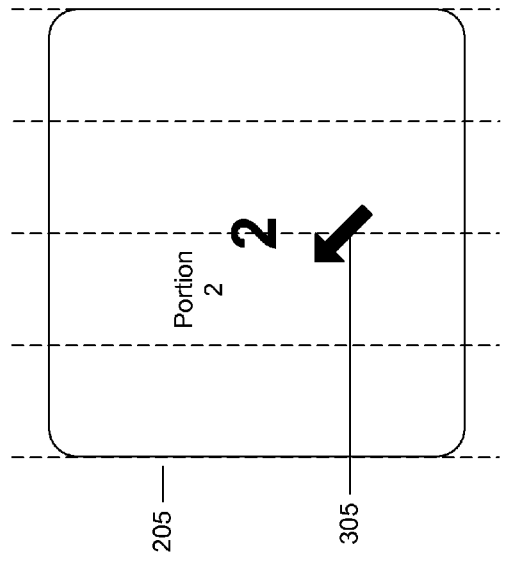
FIGS. 3A-3D are schematics of a display region displaying items corresponding to positions of a cursor on the display region.
Figure 3B:
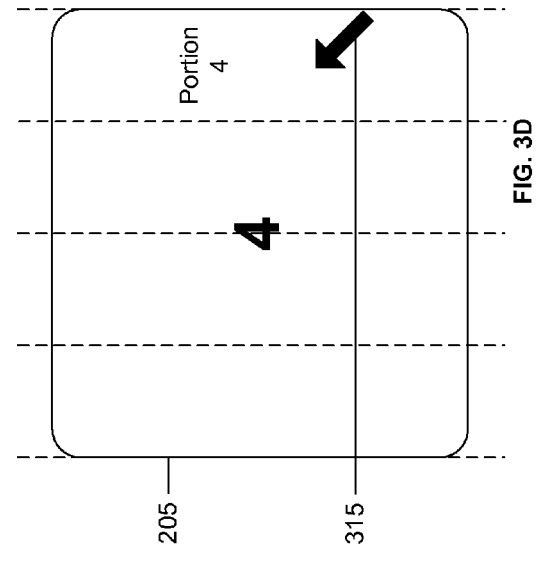
Figure 3C:
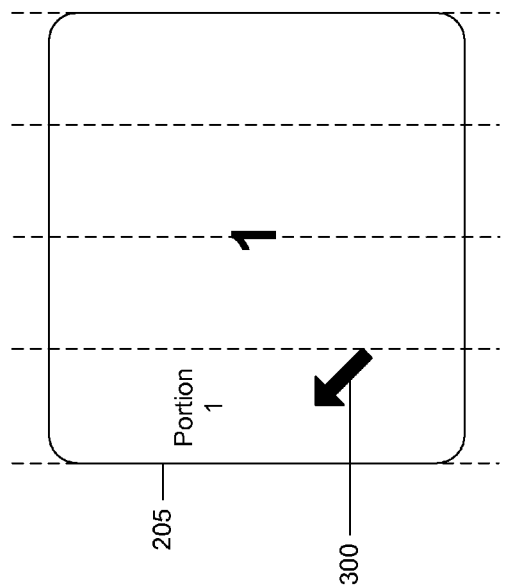
Figure 3D:
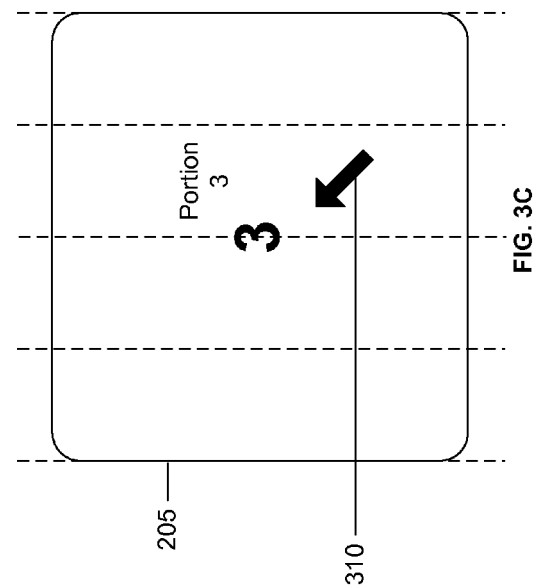

FIG. 2 depicts a schematic of a display device 135 including a user interface 200 in which display regions 205, 210, 215, 220, 225, 230, 235, 240, 245, 250, and 255 are displayed, where each display region corresponds to a container containing one or more digital images stored in the PE 105. The display device 135 includes a cursor 260 that can be controlled by a pointing device 145, e.g., a mouse, operatively coupled to the receiving device 110, to which the display device 135 is coupled. In some implementations, the user interface 200 can be a web browser, e.g., Safari, in which a user can enter a URL pointing to a location of the containers in the PE 105. Alternatively, the user interface 200 can be distinct from the web browser and can be displayed on the display device 135 when the user enters the URL pointing to the location of the containers in a web browser. The receiving device 130 can transmit a request for the containers to the PE 105. In response, the PE 105 can cause the user interface 200 to display all the containers arranged in rows, generate identifiers for each container, and transmit the generated identifiers to the receiving device 130. The user interface 200 can display all the containers arranged in rows, where each container can be represented by a corresponding display region, e.g., display region 205, display region 210, and the like. A user can access the images in a container by positioning the cursor 260 over the display region corresponding to the container and selecting the display region, e.g., by clicking the mouse. In response, the receiving device 130 can transmit a request to the PE 105 to transmit the images in the container for display. For example, when a user selects a display region representing a container using the pointing device 145, the receiving device 130 can transmit the identifier corresponding to the selected display region to the PE 105. The PE 105 can retrieve the contents at the received identifier, cause the user interface 200 to display the images in the selected container as display regions arranged in rows, generate identifiers pointing to each image in the container, and transmit the identifiers to the user interface 200. The user interface 200 can display the images arranged in rows, where each image can be represented by a corresponding display region. When the user selects one of the images in the user interface 200, e.g., by positioning the cursor 260 over the image and selecting the image, the receiving device 130 can transmit a request to the PE 105 to display the image corresponding to the identifier of the selected image. The PE 105 can cause the user interface 200 to display the selected image.

FIGS. 3A-3D depict examples of schematics of a display region 205, representing a container containing at least 4 images. The PE 105 can display the display region 205 in a user interface 200 on a display device 135 operatively coupled to a receiving device 130. A cursor 300 can be displayed on the display device 135, which can be controlled by the pointing device 145, operatively coupled to the receiving device 130. The PE 105 can be configured to divide the display region 205 into portions where each portion can correspond to at least one image in the container. When the cursor is positioned at any location within a portion, one of the images corresponding to the portion can be displayed in the region occupied by the display region 205. For example, in FIGS. 3A-3D, the region occupied by the display region 205 can be divided into 4 portions, portions 1-4, where portions 1, 2, 3, and 4 correspond to images 1, 2, 3, and 4, respectively. When the cursor 300 (FIG. 3A) is positioned in portion 1, the user interface 200 can be configured to display image 1 in the display region 205. Similarly, when the cursor 305 (FIG. 3B), cursor 310 (FIG. 3C), and cursor 315 (FIG. 3D) is positioned in portion 2, portion 3, or portion 4, the user interface 200 can be configured to display image 2, image 3, or image 4, respectively, in the display region 205. In some implementations, the PE 105 can divide the display region 205 into portions based on a number of pixels occupied by the display region 205 when displayed in the user interface 200 on the display device 135.

The number of images that can be stored in a container is limited only by available storage space. The number of portions into which a display region containing images can be divided can depend on factors including the space occupied by the cursor. For example, if the number of pixels occupied by the display region is 10, the number of images in the container is 10, and the number of pixels occupied by the cursor is 1, then the display region can be divided into 10 portions, where each portion corresponds to an image, and moving the cursor by a distance of 1 pixel from left to right across the display region can cause each image in the container to be displayed in the display region. In the example above, if the number of images in the container is 5, and the display region is divided into 5 portions, then a horizontal distance of 2 pixels on the display region can correspond to one image in the container. Consequently, when the cursor is positioned at either of the two pixels in a portion, the same image is displayed in the display region.

In the above example, if the number of images in the container is 100, then the display region can be divided into portions such that each pixel on the display region corresponds to 10 images. Due to the space occupied by the display region and by the cursor, it may not be possible to display all the images in the container in the display region when the cursor is positioned at successive locations on the display region. In such implementations, groups of images can be formed, e.g., groups 1-10, where a group can contain 10 images. Further, the display region can be divided into 10 portions, where each portion can correspond to a group, and when the cursor is positioned in a portion corresponding to a group, one of the images in the group can be displayed in the region occupied by the display region, wherein the displayed image can be automatically chosen, e.g., the $1^{st}$ image in the group, a frequently accessed image in the group, or chosen based on user input.

In some implementations, when the number of images in a container exceeds a threshold, the images in the container can be grouped. The threshold, the number of images in a group, and a number of groups can be determined based on factors including the number of pixels occupied by the display region in the user interface displayed in the display device, the number of pixels occupied by the cursor in the display device, the display settings of the display device, and the like. The number of images in each group can be equal to one another or a group can have different number of images compared to another group.

Figure 4:
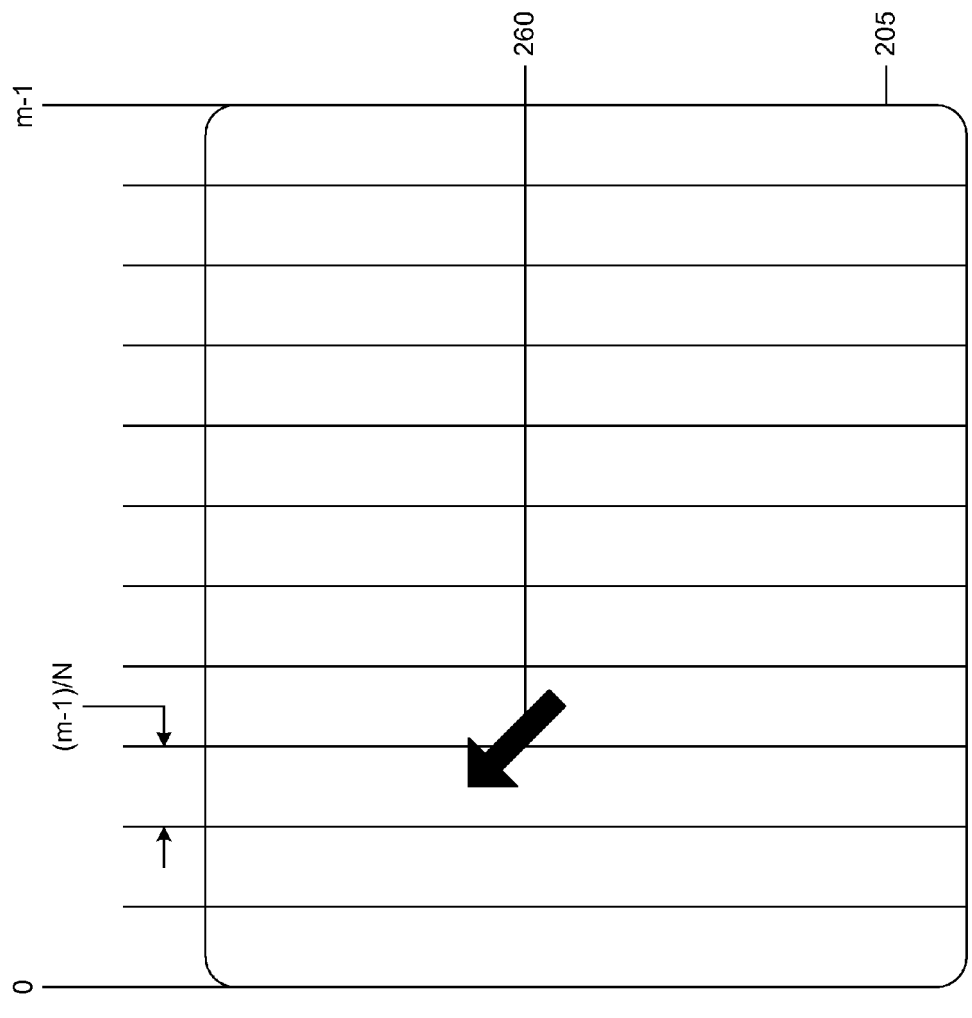
FIG. 4 is a schematic of a coordinate system of a display region displaying items of content.

FIG. 4 depicts a schematic of a display region 205 divided into multiple regions. In some implementations, the display region 205 can be rectangular in shape. An XY coordinate system can be assigned to the display region 205 wherein a direction from the left edge of the display region 205 to the right edge 205 can correspond to a positive X direction and a direction from the top edge of the display region 205 to the bottom edge of the display region 205 can correspond to a positive Y direction. Alternatively, the positive X and positive Y directions can be chosen to begin from any edge to the corresponding parallel edge of the display region 205. The origin of the X and Y axes can be positioned at the top left corner of the display region 205. The space occupied by the display region 205 can be measured based on the pixels on the display device 135. In FIG. 4, display region 205 occupies m pixels (0 to m−1). Based on a number of images in the container represented by the display region 205, the PE 105 can divide the display region 205 into N portions, such that the number of pixels occupied by each portion equals [(m−1)/N]. In some implementations, N can equal a number of images. Thus, each image in the container represented by the display region 205 can correspond to [(m−1)/N] pixels such that when the cursor 260 is positioned within a portion corresponding to an image, the user interface 200 can be configured to display the image in the display region 205. In other implementations, the PE 105 can group the images in the container to form N groups, where each group can have the same or different number of images. When the cursor 260 is positioned within a portion corresponding to an image group, the user interface 200 can display one of the images in the group in the display region 205. When a user moves the cursor to a position over a new portion, an image from the group corresponding to the new group can be displayed in the display region 205. In some implementations, the number of images in a container can be few compared to the number of pixels occupied by the display region 205. In such implementations, when a user moves the cursor to different positions within the same portion, the user interface 200 can continue to display the same image in the region occupied by the display region 205. Further, when a user moves the cursor from a position within a first portion to a position within a second portion, the user interface 205 can be configured to recognize the change in position of the cursor and display the image corresponding to the new portion on which the cursor is placed.

Figure 5:
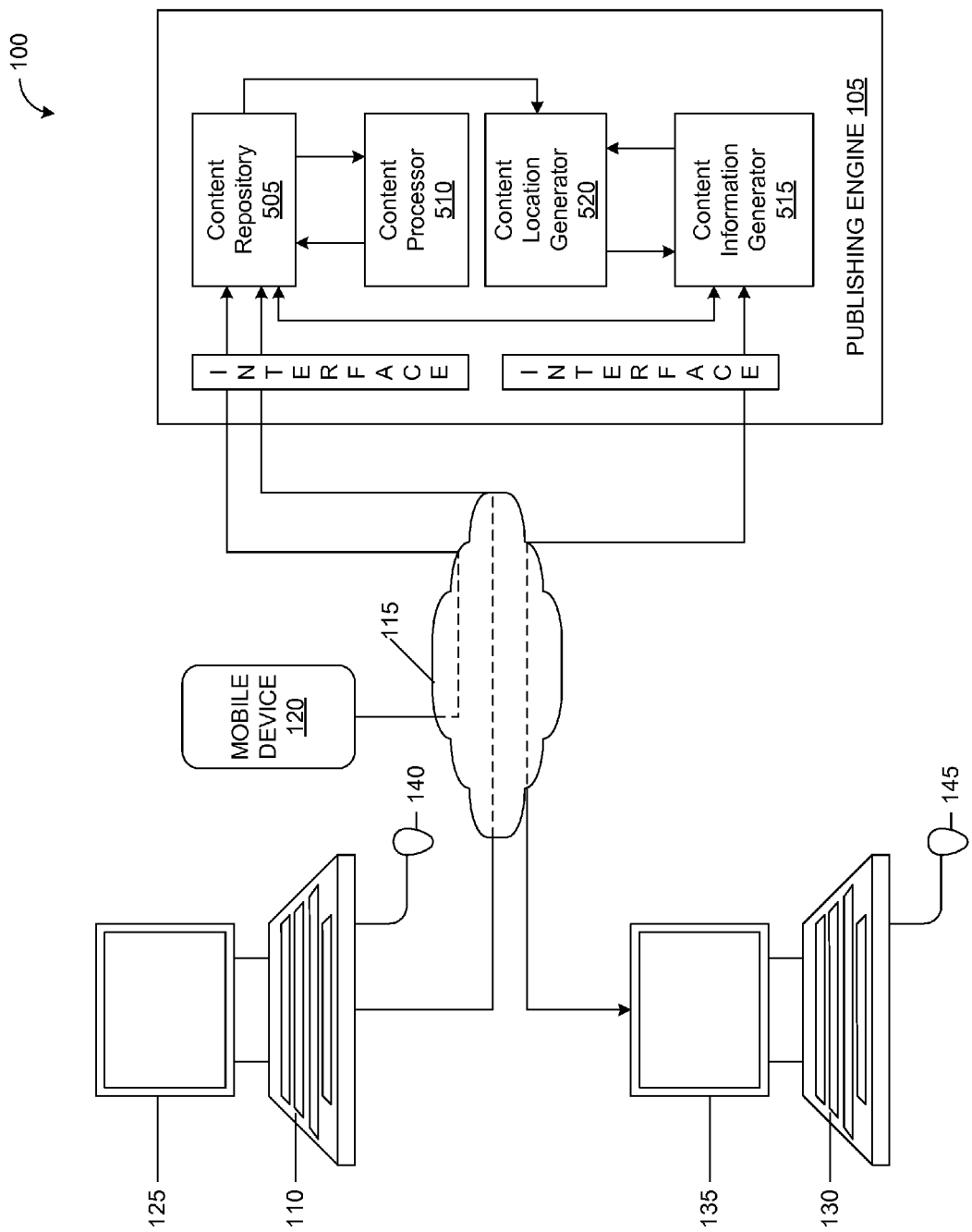
FIG. 5 is a schematic of an example of a system including a publishing engine.

FIG. 5 depicts a schematic of a system 100 including a PE 105 for enabling a user to view images stored in the PE 105 in a display device 135 operatively coupled to a receiving device 130. In some implementations, the PE 105 can include a content repository 505 in which items of content, e.g., digital images, digital video, audio, documents, and the like, received from a receiving device 110, a mobile device 120, or both, over the network 115, can be stored. For example, the PE 105 can enable the user to create an account on the PE 105, in response to which the user can be assigned space in the content repository 505. The user can upload items of content into the assigned space in the content repository 505 through an interface such as a web page. The PE 105 can store the uploaded items in the content repository 505. In some implementations, the PE 105 can include a content processor 510 that can be configured to process the content stored in the content repository 505, e.g., to reduce the size of an image received from the receiving device. Depending on the capabilities of the devices with which the digital image is captured, the space (e.g., in bytes) occupied by the image can be of the order of a few megabytes. The content processor 510 can be configured to process the image to create one or more corresponding images of reduced image sizes, e.g., of the order of a few kilobytes.

In some implementations, the PE 105 can receive a request for the images in the content repository 505 from a receiving device 130. For example, when a user uploads items of content for storage in the content repository 505 from the transmitting device 110, the PE 105 can generate an identifier, e.g., a URL, associated with the stored content and present the user with the identifier. The user can share the identifier with one or more users. One of the users can use the identifier to transmit a request to the PE 105 to access the content in the content repository 505. For example, selecting the identifier when displayed in a user interface or entering the identifier in a user interface or both, can cause the device into which the identifier is entered to transmit a request to the PE 105. The request to access the content can be received from a receiving device 130 or from the transmitting device 110 from which the PE 105 received the items of content. For example, a user requesting access to the items of content can enter the URL in a web browser, in response to which, the transmitting device 130 can send a request to the PE 105, which can, in turn, display the one or more containers containing one or more items in rows in the user interface on the display device 135 operatively coupled to the receiving device 130.

When a display region representing a container is displayed in the user interface, the receiving device 130 can determine the physical space (e.g., in pixels) occupied by the display region along the horizontal (X) and vertical (Y) axes and the physical space occupied by the section of the cursor responsible for selection, e.g., the tip of the mouse arrow, on the display device 130. The PE 105 can divide the display region into a number of portions, where the number can depend on factors including the space occupied by the cursor on the display device, the space occupied by the display region on the display device, the number of images in the container, and the like. For example, the cursor and the display region can occupy physical spaces along the X axis on the display device, e.g., 10 pixels and 100 pixels, respectively. Therefore, the PE 105 can divide the display region into 10 portions. If the container represented by the display region contains 10 images, then each portion of the display region, which can correspond to each position of the cursor within the display region, can correspond to an image in the container. In such an example, each movement of the cursor can cause the receiving device 130 to display a different image in the display region representing the container.

In the example above, if the container represented by the display region contains 2 images, then the PE 105 can divide the display region into 2 portions, where the first portion can correspond to the first image and can occupy 50 pixels of space from the left edge to the center of the display region, and the second portion can correspond to the second image from the center to the right edge of the display region. Within each portion, the cursor can occupy 5 positions. Each of the 5 positions occupied by the cursor within a portion can correspond to the same image such that when the cursor is positioned at any of the 5 positions, the receiving device 135 displays the same image in the display region. Thus, positioning the cursor at any location between pixels 0 and 49 can cause image 1 to be displayed in the display region, and positioning the cursor at any location between pixels 50 and 99 can cause image 2 to be displayed in the display region.

In this example, if the container includes 100 images and a threshold value for a number of images (e.g., 20 images) is exceeded, then the images can be grouped such that group 1 includes images 1-10, group 2 includes images 11-20, and so on, and group 10 includes images 91-100. A representative image can be selected from each of these images, e.g., the 1st image in each group, by the PE 105, using factors such as frequency with which an image in a group is accessed, or by the user. Each group can correspond to a position of the cursor on the display region. Subsequently, when the cursor is positioned in a portion within the display region, the representative image of the group corresponding to the position can be displayed in the display region. The receiving device 130 or the user interface or both can be configured to transmit the physical spaces occupied by the display region and the cursor to the PE 105. Upon receiving the physical spaces occupied by the display region and the cursor, and based on the number of images in the container represented by the display region, the PE 105 can be configured to form groups of images if the number of images in the container exceeds the threshold number of images.

The PE 105 can include a content information generator 515 configured to assemble information related to the items of content in the content repository 505, such as the item type, e.g., image, video, and the like, metadata related to the item, e.g., item size, and the like, identifiers, e.g., URLs, pointing to each item, and the like, e.g., in the generated information. The PE 105 can include a content location generator 520 configured to generate the identifier, e.g., URL, pointing to the location of the items of content. In some implementations, the content processor 510 can be configured to generate different versions of the same item of content, e.g., different size images of a full resolution image received from the transmitting device 110. The content location generator 520 can be configured to generate an identifier for each version of each image when the PE 105 receives a request for the images in the content repository 505. The content information generator 515 can include the identifiers generated by the content location generator 520 in the generated information assembled for transmission to the receiving device 130. In other implementations, the content location generator 520 can be configured to generate identifiers for less than all versions of an image generated by the content processor 510. For example, the PE 105 can determine that the network connection bandwidth between the PE 105 and the receiving device 130 requesting the content is small. Accordingly, the content location generator 520 can be configured to generate identifiers only for the small resolution versions of an image and provide the generated identifiers to the content information generator 515. In this manner, the PE 105 can be configured to deliver smaller versions of the requested images to the receiving device 130, decrease the amount of waiting time between the placement of a request and receipt of content, and thereby enhance user experience.

In some implementations, the content information generator 515 can generate information in Javascript Object Notation (JSON) format and transmit the information to the receiving device 130. In other implementations, the content information generator 515 can generate an XML version of the information and transmit the XML version to the receiving device 130. The JSON format can enable faster interaction between the receiving device 130 and the PE 105. Both, the JSON and XML format, can contain well defined format of key/value pair in a structure agreed and implemented from both the PE 105 and the receiving device 130. The PE 105 can generate the information in the JSON or XML format and transmit the information to the receiving device 130 as a string. The receiving device 130 can parse the JSON or XML string to obtain the information. The Java Script that enables previewing of images by positioning the cursor at different positions over a display region and, in response, displaying images corresponding to the cursor position in the display region can be saved as an animation and be presented to the user. In some implementations, the animation routine can be the default animation applied to the display region when the user selects a URL to display one or more display regions. Alternatively, the user can apply the animation to the display region.

The content repository 505 can be configured to store the images in one or more containers, where each container can represent an album. The containers can be received from the receiving device 110. Alternatively, or in addition, the PE 105 can be configured to divide the items into groups and store each group in a separate container based on metadata associated with the images, e.g., a date of capture. The PE 105 can be configured to display each container as a display region in a user interface on the display device 135.

The receiving device 130 or the user interface or both can be configured to transmit the physical spaces occupied by the display region and the cursor to the PE 105. Further, the PE 105 can be configured to divide each display region, displayed in the user interface, into multiple portions based on a number of images in the container represented by the display region. Since the PE 105 can divide each display region, representing a container, into portions based on a number of images in the container, and since the content location generator 520 can generate an identifier, e.g., URL, for each image, the PE 105 can associate the portions, into which a display region is divided, with the identifiers pointing to the images corresponding to each portion. For example, if a container contains 4 images, then the PE 105 can divide the display region representing the container into 4 portions, each portion corresponding to an image.

In implementations where a portion corresponds to a group of images, the group containing more than one image, one of the more than one images can be chosen for display in the display region representing the container, when the cursor is positioned over the region. The information array can include the identifier to the representative image. Further, the content location generator 520 can generate 4 identifiers, each identifier corresponding to an image. Based on the association between a portion and an image, and between an image and an identifier, the PE 105 can generate an association between the portion and the identifier. Further, the content information generator 515 can include the association between the portions of the display region representing a container and the identifiers pointing to the images in the container in the information array that is transmitted to the receiving device 130.

The PE 105 can be configured to display the display regions, representing containers including images, in the user interface 200 on the display device 135 operatively coupled to the receiving device 130. In addition, the PE 105 can be configured to transmit the information array including identifiers pointing to the images in the container, the portions into which the display region is divided, associations between the portions, and the identifiers pointing to the one or more images corresponding to the portions, and the like to the receiving device 135. When a user positions a cursor operated by the pointing device 145, operatively coupled to the receiving device 130, over a portion on the display region in the user interface, the user interface can detect the positioning of the cursor over the portion and transmit the portion information to the receiving device 130. For example, if a display region is divided into 10 portions, and the user interface detects that the cursor is positioned over the $4^{th}$ portion, the user interface can pass the portion number to the receiving device 130. Alternatively, the receiving device 130 and the user interface can be configured to identify the region occupied by the display region and determine information including whether the cursor is in the display region, the absolute position of the top left corner of the display region, the absolute position of the cursor, window scroll off-set, if any, and the like. The user interface can use the information determined by the receiving device 130 and apply mathematical algorithms to find the portion and trigger mapping behavior, e.g., like displaying an image corresponding to the position of the cursor. Upon identifying the portion of the display region over which the cursor is positioned, the receiving device 130 can determine the identifier to the image corresponding to the region from the information array. Subsequently, the receiving device 130 can transmit a request to the PE 105 over the network 115 for the image corresponding to the determined identifier. The PE 105 can transmit the image corresponding to the determined identifier to the receiving device 105 and display the image in the region occupied by the display region in the user interface 200. When a user moves the cursor to a new position over the display region, the receiving device 130 can detect the change in position of the cursor, determine the new identifier corresponding to the new position, request the image corresponding to the new identifier from the PE 105, and display the image received from the PE 105 in the display region. In this manner, for every change in the position of the cursor over a display region representing a container, an image corresponding to the cursor position can be displayed in the display region.

Figure 6:
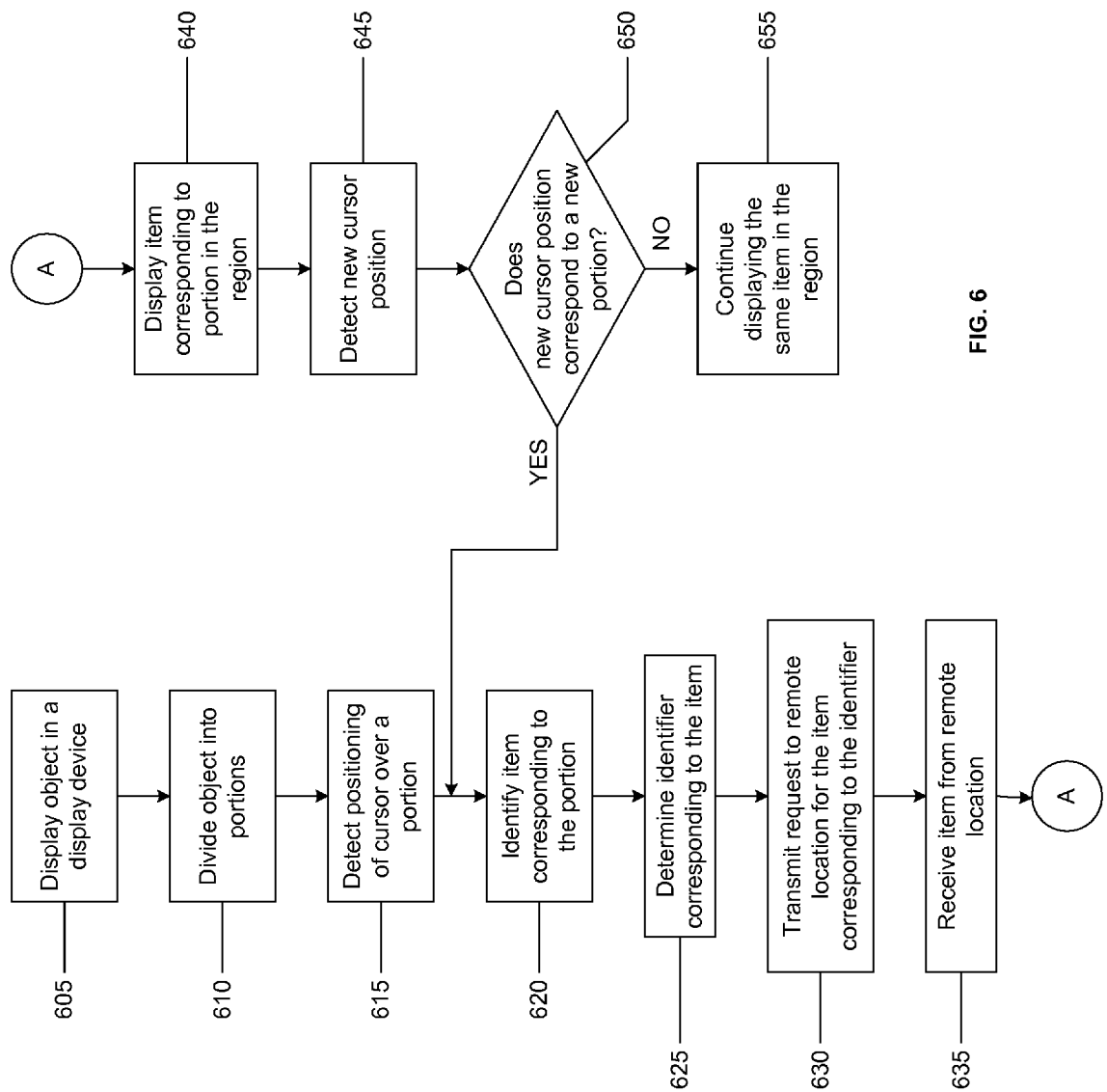
FIG. 6 is a flow chart of an example of a process for displaying content at a remote location on a display device.

FIG. 6 depicts a flow chart of an example of a process for displaying items of content at a remote location in a user interface on a display device. The items of content can be one or more of digital images, digital video, audio, documents, and the like. The items can be stored in one or more containers at a remote location, e.g., in a content repository in a publishing engine connected to a receiving device, e.g., a computer system, over a network such as the internet. A container can be displayed as a display region represented by a bounded region that can be rectangular in shape at 605. Alternatively, the bounded region representing the display region can be of any shape. The display region can be divided into multiple portions at 610, where the number of portions can depend on factors including a number of images in the container represented by the display region, the physical space (e.g., in pixels) occupied by the display region on the display device, the physical space occupied by a cursor displayed on the display device, and the like.

Each portion of the of the display region can correspond to one or more items in the container. A user can position a cursor over the display region by controlling the cursor using the pointing device operatively coupled to the receiving device. The positioning of the cursor over the portion can be detected at 615 and the item in the container corresponding to the portion can be identified at 620. In some implementations, the portion can correspond to a group of items, the group including more than one item. In such implementations, when a cursor is positioned over the portion, the group corresponding to the portion can be identifier. An information array including identifiers pointing to each image in the container can be previously received from the remote location, in response to a request to view the content in the content repository. The identifier corresponding to the item corresponding to the portion on the display region can be determined at 625.

In implementations where a portion corresponds to a group of items, a representative item can be chosen from the group and assigned to the group. In such implementations, the identifier corresponding to the representative item can be included in the information array received by the receiving device, and can be identified when the cursor is positioned over the portion corresponding to the group.

Upon determining the identifier corresponding to the item, a request for the item corresponding to the determined identifier can be transmitted to the remote location at 630. In some implementations, the identifier can be a URL pointing to the item in the content repository, and the request for the item can be transmitted over the network, e.g., the internet. The remote location can transmit the item to the receiving device and the item can be received from the remote location at 635. The received item, corresponding to the portion over which the cursor is located, can be displayed in the display region of the display region at 640.

In some implementations, a user can move the cursor on the display device and change the position of the cursor over the display region. A change in the cursor position can be detected and a new cursor position can be determined at 645. A check can be performed to determine if the new cursor position corresponds to a new portion of the display region at 650. For example, a portion of the display region can be large and the number of images in a container can be small such that more than one position of the cursor on the portion can correspond to the same image. In such instances, when the cursor is moved to a new position, new position can lie within the same portion, and the same item can continue to be displayed in the bounded region of the display region at 655. If the new cursor position corresponds to a new portion, which in turn corresponds to an item different from the one displayed in the region, the new item can be retrieved from the remote location by repeating steps 620-640. In this manner, for different positions of a cursor over different portions of an display region, different items of content in the container represented by the display region can be displayed in the bounded region of the display region. A user can move a cursor across the display region to see all or fewer than all the items in the display region. The items in the container can be stored in a sequence such that, in some implementations, a progression of positions of the cursor on the display region from left to right can correspond to an order of items in the sequence from a start of the sequence to a finish of the sequence.

Figure 7:
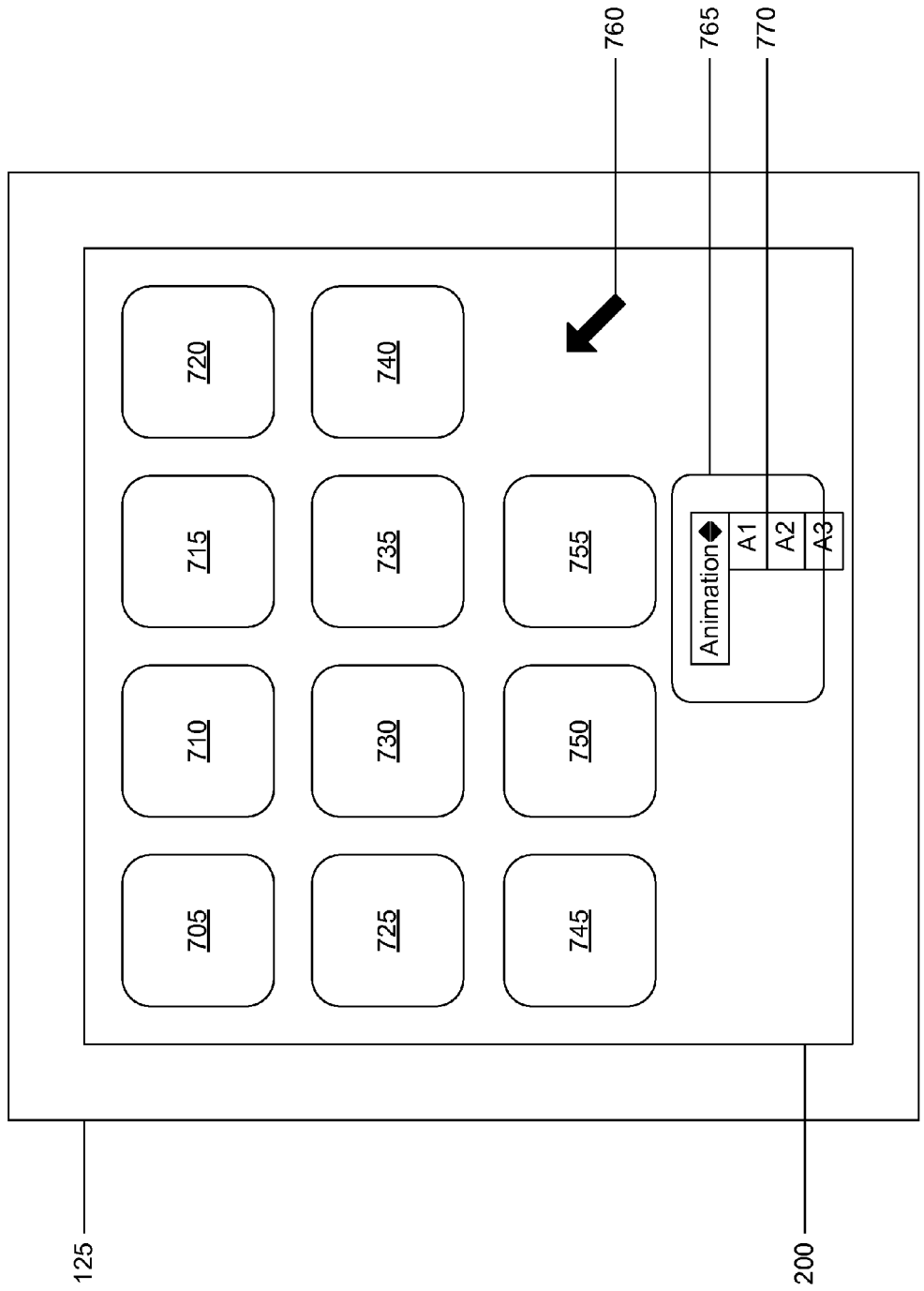
FIG. 7 is a schematic of an example of a user interface for creating and applying animations to display regions.

FIG. 7 depicts a schematic of a display device 125, operatively coupled to a transmitting device 110, in which a user interface (UI) 200 is displayed. In addition, display regions 705, 710, 715, 720, 725, 730, 735, 740, 745, 750, and 755 are displayed in the user interface 200. In some implementations, a user can add content, e.g., images, to the content repository 505 in the PE 105, specify containers in which the images are to be stored and specify animations that the user wishes to apply to the display regions representing the containers. For example, when the UI 200 is first displayed on the display device 125, the UI 200 can be blank. The user can be provided with user-selectable templates illustrating the appearance of each container. Alternatively, the user can design a user-defined template to illustrate the appearance of a container. The template can include a display region for each container. The user can add as many display regions to the blank UI 200 as the user desires. In this manner, the user can add display regions 705-710 to the UI 200. Subsequently, the user can include content, e.g., images, in each display region. For example, the user can drag the images stored in a storage device operatively coupled to the transmitting device 110, e.g., the hard disk of the transmitting device, and drop the images in a container represented by a display region. Alternatively, or in addition, the user can use a keyboard operatively coupled to the transmitting device 110 to add content to the containers. In this manner, the user can populate each container with one or more images or any other type of content, e.g., video, documents, and the like.

In a default implementation, an animation can be applied to each display region when a container is created. The default animation can enable previewing the images in the container when a cursor 760 is moved across a display region, e.g., 705, representing the container. Thus, when the user creates a display region, e.g., 705 representing a container including images, and moves the cursor 760 over the display region 705, images corresponding to positions of the cursor 760 on the display region 705 can be displayed in the display region 705. Similarly, the default animation can be applied to all display regions 710-755, enabling a user to preview images in all the containers.

In some implementations, a user can change the default animation applied to the display regions 705-710. The user can select a display region, e.g., by positioning the cursor 760 over the display region and clicking a pointing device 145 controlling the cursor. In response, a heads up display (HUD) 765 can be displayed, where the HUD 765 can include a menu 770 of animations A1, A2, A3, and the like. In some implementations, the HUD 765 can be a window displayed over the UI 200 adjacent to the selected display region. Each animation can be pre-composed and stored, e.g., as a Java Script routine. When the user selects an animation from the menu 770 in the HUD 765, the Java Script routine corresponding to the animation can be applied to the display regions 705-715.

For example, as illustrated in FIG. 7, animation A1 can represent a "Dissolve" routine. When the user selects animation A1 from the menu 770 and positions the cursor 760 over a display region, e.g., 705, the images in the container represented by display region 705 can be previewed by a dissolving animation. Other animations that can be included in the menu 770 can include "Random," "Reveal," "Push," "Fade Through Black," "None," and the like. For example, in an implementation where "Random" is the applied animation, the user can position the cursor over the display region causing the animation to be displayed in the display region. When the cursor is removed from the display region, the animation can be stopped and an image, in the container represented by the display region, can be displayed in the display region. Subsequently, when the cursor is re-positioned on the display region, the animation can be re-applied to the display region. In other implementations, once the user positions the cursor within the display region to commence animation, removing the cursor from within the display region can continue the animation applied to the display region. In some implementations, the user can create custom animations and include the animations in the menu 770. Each animation can be represented by a selectable link in the menu 770. When the user causes the display of the HUD 765 and selects the menu 770, the animations in the menu 770 can be displayed for selection by a user. In some implementations, the selected animation can be applied to all the display regions in the UI 200. In other implementations, a different animation can be applied to each display region. In other implementations, the user can select less than all the display regions in the UI 200 and apply a common animation to the selected display regions.

In this manner, the user, by adding content to the content repository 505 in the PE 105, can specify the content and corresponding display regions in which the content is to be displayed, as well as apply animations to the display regions. The user can design the UI 200 in which the user desires to present the images. Subsequently, when the user transmits the designed UI 200 to the PE 105, the PE 105 can store the UI 200 design and provide the user with an identifier, e.g., a URL, that points to the created UI 200. The user can provide other users with the identifier to share the content captured by the user. In order to view the images in the content repository 505, a user can request the PE 105 to provide the content. The requesting user can select the identifier pointing to the designed UI 200. When the PE 105 receives the identifier, the PE 105 can transmit the designed UI 200 to the requesting user. When a user views the created UI 200, the animations applied to each display region by the user that created the UI 200 can be displayed. In some implementations, the user that created the UI 200 can allow users viewing the UI to alter the animations of the display regions. Alternatively, the user that created the UI 200 can restrict and disallow other users from altering the animations of the display regions.

Figure 8:
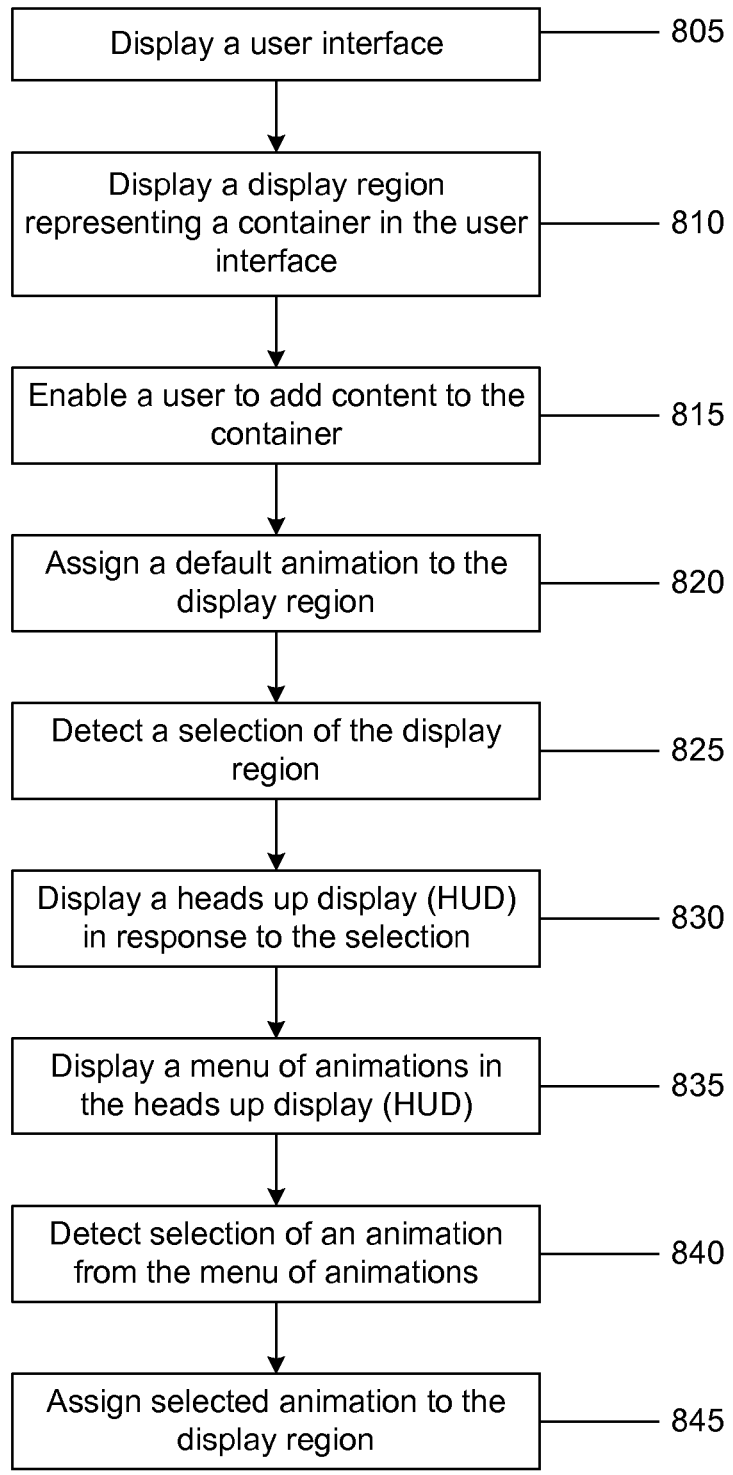
FIG. 8 is a flow chart of an example of a process for creating a user interface and applying an animation to a display region in the user interface.

FIG. 8 is a flow chart of an example of a process for creating a user interface to display a display region to represent a container including images, and to apply an animation to the display region. A user interface can be displayed in a display device at 805. In some implementations, the user interface can be rectangular in shape. The user interface can be displayed in response to a request from a user. A display region can be displayed in the user interface at 810. In some implementations, a display region can be displayed when the user interface is displayed. Alternatively, a user can add a display region to a blank user interface. The display region can represent a container to which content items, e.g., images, videos, documents, and the like can be added. Adding content to the container by dragging the content and dropping the content onto the display region can be enabled at 815. In some implementations, the content can be stored on a storage device. The user can position the cursor, operated by a pointing device, e.g., a mouse, on an icon representing a content item, select the icon, and drag and drop the icon over the display region. This can cause either the content or a copy of the content to be added to the container.

In some implementations, an animation can be applied to the display region at 820. The animation can enable previewing the content, e.g., images, in the container represented by the display region by moving a cursor across the display region. The position of the cursor on the display region can correspond to an image in the container such that as the cursor is moved across the display region, images corresponding to the different positions are displayed in the display region. In other implementations, when the images are added to the container represented by the display region, the animation can be automatically applied to the display region. The user designing the user interface by adding a display region and adding content to the container represented by the display region can change the animation of the display region using a menu of animations. In some implementations, the user can select the display region. The selection of the display region can be detected at 825. In response to the selection of the display region a heads up display (HUD), e.g., an object, such as a window, can be displayed, e.g., adjacent to the display region, at 830. A menu of animations can be displayed in the HUD at 835. The menu of animations can include animations including "Random," "Reveal," "Push," "Fade Through Black," "None," and the like. In some implementations, each animation can be pre-composed and stored as a Java Script routine, and included in the menu of animations as a selectable link. The user selects one of the animations from the menu of items, e.g., by selecting the link, at 840. The selected animation can be applied to the display region at 845. In this manner, the user creating the user interface including the display region representing the container of images can apply and alter animations to the display region.

Implementations of the subject matter and the functional operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, near-touch input, or tactile input.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

A number of implementations have been described. Nevertheless, it will be understood that various modifications may be made without departing from the spirit and scope of the disclosure. For example, in implementations where several containers are available in the content repository, the user interface maybe unable to accommodate all the display regions representing the containers. In such implementations, a scroll bar may be included to the user interface so a user may scroll the screen to access containers that are not displayed on the display device. In such implementations, the physical space occupied by the display region representing a container can change when the user scrolls the screen. Since scrolling causes the display region to be moved, as a whole, the portions into which the display region is divided and the physical relationship between portions, e.g., distance between two portions, of an display region remains unchanged. In implementations where horizontal scrolling causes a change in the images displayed in the display region, the user interface can recognize the positioning of a cursor on or adjacent to a left edge of the display region within the bounded region of the display region, regardless of where the display region is located on the display device. The user interface can be configured to recognize the positioning of a cursor at the left edge of a display region or adjacent to the left edge within the bounded region of the display region, regardless of the location of the display region in the user interface. In this manner, the effect of a change in the location of the display region in the user interface can be accounted for while updating the images displayed in the display region based on cursor positions.

In some implementations, the user interface can be configured to detect the positioning of a cursor on a portion of the display region and communicate the portion to the receiving device. Subsequently, the receiving device can transmit information related to the portion and the display region to the PE. The PE can determine the image corresponding the portion based on the portion and display region information and transmit the image to the receiving device. The receiving device can display the display region in the user interface. In this implementation, identifiers related to the items need not be generated by the PE and transmitted to the receiving device. The receiving device can transmit portion information received from the user interface to the PE and receive the items from the PE.

In some implementations, a default image can be chosen from the items in the container and displayed in the display region when the cursor is positioned outside the bounded region of the display region. For example, the default image can be the first image in the container. Alternatively, the default image can be chosen based on factors including a frequency with which images in the group are accessed, image resolution, and the like. Further, when the user interface displays the display region for the first time on the user's display device, the default image will be displayed. For example, a user can access a URL that can cause the user interface to display one or more display regions. When the display regions are displayed on the user interface for the first time, the default image can be displayed in the display region. A user can select one of the display regions to view the images in the region. Subsequently, the user can navigate backward to display all the display regions in the user interface. When the user navigates backward, the default image can be displayed in the display region. In some implementations, an image corresponding to the location of the cursor on the display region may fail to be displayed in the display region. This may occur for reasons including a slow network connection, a missing image, and the like. In such instances, if the image corresponding to the position of the cursor on the display region is unavailable, the default image can be displayed in the display region instead.

In implementations where the progression of positions in the region from left to right corresponds to the order of items in the sequence from a start of the sequence to a finish of the sequence, there display in the display region can remain the same when the cursor is moved vertically. Alternatively, the PE can be configured such that the progression of positions from top to bottom corresponds to the order of items in the sequence from a start to the finish. Further, any direction of movement of the cursor can be caused to correspond to any order in which the images are stored in the container. In some implementations, the PE 105 can receive new items for inclusion in the content repository after the information array is sent to the receiving device. In such implementations, the PE can be configured to recognize that an information array has been sent to a receiving device, generate a new information array including the items that were recently stored in the repository, transmit the new information array to the receiving device, and refresh the user interface. The new information array can include identifiers pointing to the recently stored items. This can enable a user to view the recently stored items in the display region representing the container. In other implementations, the PE can be configured to periodically check the content repository for new items and update the information array and the user interface when new items are detected in the repository.

In some implementations, the display region on the user interface can represent a digital video file. The display region can be divided into portions where a portion can correspond to one or more frames of the video such that moving the mouse across the display region can cause the frame corresponding to the portion to be displayed in the display region. In this manner, the content of the video file can be viewed in the display region. In other implementations, the item can be an audio file where moving the cursor across the display region can cause the audio file to be played. Alternatively, the item can represent a document containing pages where each position of the cursor on the display region can cause a different page in the document to be displayed in the container. In some implementations, the network can be an intranet. A user at a first node on the intranet can upload an item, e.g., a document at a common storage location on a server of the intranet. A user at a second node on the intranet can access and view the pages of the stored document using the cursor. Accordingly, other implementations are within the scope of the following claims.

What is claimed is:

1. A computer-implemented method comprising:
   displaying concurrently, on a display device associated with a computer system, a plurality of display regions, each display region corresponding to a respective container at a remote location operatively coupled to the computer system over a network, wherein each container includes at least two content items including a first content item and a second content item;
   dividing each display region into at least two portions, wherein each portion corresponds to one of the at least two items;
   receiving at least two identifiers including a first Uniform Resource Locator (URL) and a second URL from the remote location, wherein each URL corresponds to a content item of the at least two content items, and wherein the first URL and the second URL correspond to the first content item and the second content item, respectively, wherein the first URL is different from the second URL; and
   upon detecting a positioning of a position indicator in a first portion of the at least two portions of a particular display region,
      transmitting a request to the remote location for the first content item that is stored in a particular container to which the particular display region corresponds,
      receiving the first content item, and
      displaying the first content item in the particular display region.

2. The method of claim 1 wherein the content items are digital images.

3. The method of claim 1 wherein the at least two content items are stored in the particular container in a sequence, the sequence representing an order in which the content items were captured.

4. The method of claim 3 wherein a progression of positions in the particular display region from left to right corresponds to an order of content items in the particular container in the sequence from a start of the sequence to a finish of the sequence.

5. The method of claim 1 further comprising, upon detecting the positioning of the position indicator in the first portion,
   identifying the first URL that corresponds to the first content item corresponding to the first portion;
   transmitting a request to the remote location for a content item corresponding to the first URL;
   receiving the first content item corresponding to the first URL from the remote location; and
   displaying the received first content item on the display device.

6. The method of claim 1 further comprising, upon detecting the positioning of the position indicator from the location in the first portion to a location in a second portion of the at least two portions,
   transmitting a request to the remote location for the second content item that is stored in the particular container to which the particular display region corresponds;
   receiving the second content item from the remote location; and
   displaying the received second content item in the particular display region instead of the first content item.

7. The method of claim 1 further comprising, upon detecting the positioning the position indicator outside the display region, displaying a default item of the at least two items in the region.

8. The method of claim 7, wherein the default item is determined based on user input.

9. The method of claim 1 further comprising, when a number of items of content in the particular container exceeds a threshold:
   forming at least two groups of items of content, a group comprising at least two but less than all the items of content in the container;
   dividing the display region into group portions, wherein each group portion corresponds to one of the groups;
   assigning one item of content in a group as a representative item for the group; and
   upon detecting a positioning of a position indicator cursor in a first group portion, transmitting a request to the remote location for the representative item of the first group, corresponding to the first group, receiving the representative item, and displaying the representative item in the particular display region.

10. The method of claim 1, wherein displaying the first content item in the at least one display region comprises displaying only the first content item in the at least one display region.

11. A computer-readable medium bearing instructions to enable one or more machines to perform operations comprising:

displaying concurrently, on a display device associated with a computer system, a plurality of display regions, each display region corresponding to a respective container at a remote location operatively coupled to the computer system over a network, wherein the container includes at least two content items including a first content item and a second content item;

dividing each display region into at least two portions, wherein each portion corresponds to one of the at least two items;

receiving at least two identifiers including a first Uniform Resource Locator (URL) and a second URL from the remote location, wherein each URL corresponds to a content item of the at least two content items, and wherein the first URL and the second URL correspond to the first content item and the second content item, respectively, wherein the first URL is different from the second URL; and upon detecting a positioning of a position indicator in a first portion of the at least two portions of the particular display region, transmitting a request to the remote location for the first content item that is stored in a particular container to which the particular display region corresponds, receiving the first content item, and displaying the first content item in the particular display region.

12. The computer-readable medium of claim 11 wherein the content items are digital images.

13. The computer-readable medium of claim 11 wherein the at least two content items are stored in the particular container in a sequence, the sequence representing an order in which the content items were captured.

14. The computer-readable medium of claim 13 wherein a progression of positions in the particular display region from left to right corresponds to an order of content items in the particular container in the sequence from a start of the sequence to a finish of the sequence.

15. The computer-readable medium of claim 11, the operations further comprising, upon detecting the positioning of the position indicator in the first portion, identifying the first URL that corresponds to the first content item corresponding to the first portion;

transmitting a request to the remote location for a content item corresponding to the first URL;

receiving the first content item corresponding to the first URL from the remote location; and displaying the received first content item on the display device.

16. The computer-readable medium of claim 11, the operations further comprising, upon detecting the positioning of the position indicator from the location in the first portion to a location in a second portion of the at least two portions, transmitting a request to the remote location for the second content item that is stored in the particular container to which the particular display region corresponds;

receiving the second content item from the remote location; and displaying the received second content item in the particular display region instead of the first content item.

17. The computer-readable medium of claim 11, the operations further comprising, upon detecting the positioning the position indicator outside the display region, displaying a default item of the at least two items in the region.

18. The computer-readable medium of claim 17, wherein the default item is determined based on user input.

19. The computer-readable medium of claim 11, the operations further comprising, when a number of items of content in the particular container exceeds a threshold:

forming at least two groups of items of content, a group comprising at least two but less than all the items of content in the container;

dividing the display region into group portions, wherein each group portion corresponds to one of the groups;

assigning one item of content in a group as a representative item for the group; and upon detecting a positioning of a position indicator in a first group portion, transmitting a request to the remote location for the representative item of the first group, corresponding to the first group, receiving the representative item, and displaying the representative item in the particular display region.

20. The computer-readable medium of claim 11, wherein displaying the first content item in the at least one display region comprises displaying only the first content item in the at least one display region.

21. A computer-implemented method comprising:

displaying a user interface on a display device associated with a computer system;

displaying a display region representing a container including at least two content items in the user interface, wherein the container is at a remote location operatively coupled to the computer system over a network, and wherein the at least two content items are stored in the container at the remote location;

enabling a user to add content items to the container;

applying a respective animation to the display region, wherein in response to detecting that a position indicator is positioned over a first portion of the display region, a first content item of the at least two content items stored in the container is retrieved from the respective container at the remote location and only the first content item of the at least two content items is displayed in the display region, and wherein in response to detecting that the position indicator is positioned over a second portion of the display region, a second content item of the at least two content items stored in the container is retrieved from the container and only the second content item of the at least two content items is displayed in the display region; and upon detecting a selecting of the display region, displaying an object including a menu of animations;

enabling a user to select a new animation from the menu of animations; and applying the new animation to the display region.

22. The method of claim 21, wherein the position indicator is a cursor, and wherein the selecting of the display region comprises positioning the cursor over the display region and selecting a pointing device configured to control the cursor.

23. The method of claim 22, wherein the selecting comprises clicking the pointing device.

24. The method of claim 21 wherein the menu of animations includes one or more of dissolve, random, reveal, and fade through black.

25. The method of claim 21 wherein selecting an option from the menu of animations causes no animation to be applied to the display region.

26. The method of claim 21 wherein the new animation is displayed as a clickable button in the menu of animations.

27. The method of claim 21, wherein each of the at least two content items is a digital image uploaded for storage in the container at the remote location.

28. A computer-readable medium bearing instructions to enable one or more machines to perform operations comprising:
    displaying a user interface on a display device associated with a computer system;
        displaying a display region representing a container including at least two content items in the user interface, wherein the container is at a remote location operatively coupled to the computer system over a network, and wherein the at least two content items are stored in the container at the remote location;
    enabling a user to add content items to the container;
    applying a respective animation to the display region, wherein in response to detecting that a position indicator is positioned over a first portion of the display region, a first content item of the at least two content items stored in the container is retrieved from the respective container at the remote location and only the first content item is displayed in the display region, and wherein in response to detecting that the position indicator is positioned over a second portion of the display region, a second content item of the at least two content items stored in the container is retrieved from the container and only the second content item is displayed in the display region; and
    upon detecting a selecting of the display region, displaying an object including a menu of animations;
    enabling a user to select a new animation from the menu of animations; and
    applying the new animation to the display region.

29. The computer-readable medium of claim 28, wherein the position indicator is a cursor, and wherein the selecting of the display region comprises positioning the cursor over the display region and selecting a pointing device configured to control the cursor.

30. The computer-readable medium of claim 29, wherein the selecting comprises clicking the pointing device.

31. The computer-readable medium of claim 28 wherein the menu of animations includes one or more of dissolve, random, reveal, and fade through black.

32. The computer-readable medium of claim 28 wherein selecting an option from the menu of animations causes no animation to be applied to the display region.

33. The computer-readable medium of claim 28 wherein the new animation is displayed as a clickable button in the menu of animations.

34. The computer-readable medium of claim 28, wherein each of the at least two content items is a digital image uploaded for storage in the container at the remote location.

\* \* \* \* \*

UNITED STATES PATENT AND TRADEMARK OFFICE
CERTIFICATE OF CORRECTION

| | |
|---|---|
| PATENT NO. | : 8,261,209 B2 |
| APPLICATION NO. | : 11/834589 |
| DATED | : September 4, 2012 |
| INVENTOR(S) | : Ken Goto et al. |

It is certified that error appears in the above-identified patent and that said Letters Patent is hereby corrected as shown below:

In column 20, line 51, in Claim 7, after "positioning" insert -- of --.

In column 20, line 66, in Claim 9, after "indicator" delete "cursor".

In column 22, line 10, in Claim 17, after "positioning" insert -- of --.

Signed and Sealed this
Eighteenth Day of December, 2012

David J. Kappos
*Director of the United States Patent and Trademark Office*